United States Patent Office 2,872,432
Patented Feb. 3, 1959

2,872,432

ANTISTATIC RESIN COMPOSITIONS

Alfred P. Metzger, Tampa, Fla., assignor to Union Carbide Corporation, a corporation of New York No Drawing. Application March 13, 1956
Serial No. 571,156

11 Claims. (Cl. 260—45.5)

This invention relates to a method of suppressing electrostatic charges in plastic compositions. More specifically, this invention is directed to a method of suppressing electrostatic charges in plastic compositions normally tending to generate such charges, by incorporating into the plastic composition a polymeric reaction product of a polyepoxy compound and a high molecular weight polyoxyalkylene polyol. It is also directed to such antistatic plastic compositions thus prepared as new compositions of matter.

The problem of static electricity in plastic compositions is generally recognized and much effort has been devoted to eliminating or reducing the magnitude of accumulated electrostatic charges. The problem is manifested in contamination and dust accumulation on the plastic article and in annoying shocks and sometimes dangerous sparks from formed articles, textiles, and films. It is also noticed in the clinging and frictional tendencies of such plastic composition when rubbed over a different composition of material. These difficulties arise not only in the service life of the formed plastic compositions, such as sheets, films, filaments, and cast and molded articles, but also during the manufacturing of such articles, which can result in a slow down in production, waste, and hazards of explosions.

Many methods have been proposed to reduce the accumulation of static charges, none of which are entirely satisfactory. External methods such as temperature and humidity control, and exposure to radio-activity have been employed in production operations but antistatic protection thereby secured is temporary and exists only when the plastic composition is exposed to such conditions.

A great number of agents have also been proposed for treating the surface of plastic compositions to prevent the generation or accumulation of electrostatic charges. However, such treatments are generally temporary in nature since these agents are removed by washing, leaching or abrasion. Some of these treating agents are extremely difficult to apply to the plastic composition and others are very expensive. All surface treatment methods, however, require additional handling of the formed plastic composition during such treatment. This is generally undesirable from a production handling and cost standpoint, and undesirable to the ultimate user if repeated applications are necessary. One such agent effective in surface applications is that advocated by Myers in U. S. Patent 393,863, using a polyoxyethylene glycol having an average molecular weight of at least 900. While such a surface treatment is effective, static protection of the article is removed with washing or contact with water because of the high water solubility of the glycol, and repeated applications are necessary.

The polyoxyethylene glycols when incorporated directly into the resin composition in amounts sufficient to give antistatic protection, are also unsatisfactory permanent antistatic agents. The physical properties of the plastic composition are adversely affected and the polyoxyethylene glycol tends to migrate to the surface or sweat out. This sweating out causes an unpleasant greasiness to the surface of the plastic article which is undesirable and renders the article of little commercial value. Also, because of the high water solubility of these glycols, the permanency of protection is not sufficient for most applications.

It is known that internal modification of plastic compositions may be effective in reducing static accumulation. Such internal modification is generally superior to any surface treatment or coating because of the permanency achieved, and can be accomplished in any of three ways: by adding to the plastic composition an antistatic agent which is unreactive with the plastic composition, by adding an antistatic agent which is reactive with the plastic composition such that it is chemically tied into the plastc composition, and also by altering the chemical composition of the plastic itself without the aid of additives.

This invention particularly concerns the use of an antistatic agent which is unreactive with the plastic composition. Additives of this type to be desirable, should have no undesirable effects on other physical properties of the plastic composition when used in concentrations effective to give satisfactory antistatic protection and should be sufficiently permanent to give such protection for the service life of the article.

It is, therefore, one of the objectives of the present invention to provide a method for suppressing electrostatic accumulation by an antistatic agent which can be incorporated into a resinous composition, and eliminate the necessity of repeated separate surface applications to obtain substantial antistatic protection over the service life of the article.

It is a further object of this invention to provide an antistatic agent, which, when incorporated into a resinous composition, will not sweat out or exude to the surface of the composition.

It is still a further object of this invention to provide an antistatic agent for reducing the static generating and accumulating tendency of the wide variety of resinous compositions which will not react with the resinous composition or seriously alter or change the physical properties of the resin blend, when employed in amounts sufficient to give effective antistatic protection.

According to the present invention, it has been found that electrostatic generating tendencies of plastic or resinous compositions can be suppressed by incorporating into the composition at least one part by weight per hundred parts of the composition of a high molecular weight polymeric product of the reaction of a polyoxyalkylene polyol having an average molecular weight of at least 600 and a polyepoxy compound. These resultant high molecular weight products have been found to give antistatic protection which is substantially permanent for the service life of the plastic article. It has also been found that these products do not sweat out or exude to the surface of the plastic article, and are not easily leached out by exposure to water.

These polymeric products are believed to be polyoxyalkylene polyol or polyglycol chains attached to the residue of the polyepoxy compound. They may be primarily linear in structure with two or more polyol or polyglycol chains connected through the residue of the polyepoxy compound, or they can be substantially cross-linked structures, the degree of cross-linking depending primarily upon the amount of polyepoxy compound employed in their preparation.

The polyoxyalkylene polyols which are useful in preparing these polymeric products are commonly made by the polymerization of an alkylene oxide having terminal epoxy groups, such as ethylene oxide, propylene oxide, butylene oxide and the like, on an aliphatic or aromatic compound having preferably at least two primary hydroxyl groups, but which may contain one or more secondary hydroxyl groups. Such compounds as may be used to prepare these polyols are ethylene glycol, propylene glycol, glycerol, diethylene glycol, sorbitol, sucrose, and the like polyhydroxy compounds. Preferred in the reaction to produce these products are the linear chain polyoxyalkylene glycols represented by the general formula $H-O(RC_2H_3-O)_n-H$ wherein R is a member selected from the group consisting of hydrogen and lower alkyl groups having from one to three inclusive, carbon atoms, and $n$ is an integer such that the average molecular weight of the polyglycol chain is at least 600. Of this class, the polyoxyethylene glycols and polyoxypropylene glycols having an average molecular weight of between about 1000 and about 10,000 are preferred. More particularly preferred are the polyoxyethylene glycols. It is permissible for these polyols and polyglycols to contain one or more alkali metal alcoholate groups.

The organic polyepoxy compounds suitable for use in preparing these polymeric products are organic compounds having as the sole reactive groups under the conditions of this reaction, at least two epoxy groups. By the term "sole reactive groups under the conditions of the reaction" it is meant to exclude compounds containing carboxyl, hydroxyl, phenolic hydroxyl, amino, amido, imido, and mercapto groups, which have been found to be reactive under the conditions of this reaction with epoxy groups of the polyepoxy compound or with the hydroxyl groups or alkali metal alcoholate groups of the polyoxyalkylene glycol. Such groups will interfere with the desired condensation. These polyepoxy compounds free of such interfering groups can be aliphatic and aromatic, and can contain non-interfering substituent groups such as alkyl, aryl, organic ester, phosphate ester, halogen, cyano groups, and the like without interfering with the condensation. Olefinic unsaturation in the polyepoxy compound can also be present.

The preferred organic polyepoxy compounds are the aliphatic and aryl substituted aliphatic compounds having as the sole reactive groups under the conditions of the reaction, at least two epoxy groups, and wherein oxygen is present only in oxirane, ether, and ester arrangement. Particularly preferred are the diepoxy compounds consisting only of carbon, hydrogen, and oxygen, wherein oxygen is present only in oxirane, ether and ester arrangement, and the epoxy groups are terminal groups of an aliphatic or aryl substituted aliphatic compound. Representative of these preferred compounds are butadiene diepoxide, diglycidyl ether, and the diglycidyl ether of 2,2-bis(4-hydroxyphenyl)-propane.

A variety of organic polyepoxy compounds can be used. While it is preferred that the epoxy groups be terminal groups, aliphatic and substituted aliphatic compounds having adjacent carbon atoms of the epoxy group as adjacent intermediate carbon atoms of a linear chain may be used. However, compounds having such internal epoxy groups react somewhat slower compared with those compounds having terminal epoxy groups.

A mixture of two or more polyepoxy compounds can be used to produce the antistatic agents of this invention, or if desired, the polyoxyalkylene glycol can be reacted successively with different polyepoxy compounds to obtain these polymeric products.

The polyepoxy compounds serve both as chain extenders between polyoxyalkylene glycol chains and as cross-linking agents. It is possible to obtain these antistatic agents having average molecular weights many fold over those of the starting polyoxyalkylene glycols. The products can be chain products substantially linear in structure or can be substantially cross-linked, depending primarily upon the molecular ratio of particular polyepoxy compound to polyglycol employed in their preparation. The products which are primarily linear in structure exhibit a high degree of water-solubility. With an increase in the degree of cross-linking present in the product, the water solubility decreases.

The polymeric products I have found to be most useful in providing antistatic protection are those prepared employing from about 0.2 mole to about 2.0 moles per mole of polyepoxy compound per mole of polyol or polyglycol. While products can be prepared employing greater amounts of polyepoxy compound, they are not desirable for use in resinous compositions because of the difficulty in incorporating the agent into the resinous composition. Those products made using polyoxyethylene glycols and low concentrations of polyepoxy compound, such as around 0.2 to 0.5 mole per mole of polyglycol are soft, wax-like products and exhibit a high degree of water-solubility and are easily incorporated into resinous compositions. The rigidity and water-insolubility increase with an increase in amount of polyepoxy compound employed and at amounts of about 1.5 moles of polyepoxy compound per mole of polyglycol or higher, the products are essentially water insoluble and can be slightly flexible. More rigid products can be made by employing greater amounts of polyepoxy compound although the rigid products are more difficult to incorporate into resinous compositions because of their high fluxing temperatures than are the soft waxy products. The preferred products are those prepared using molar amounts of polyepoxy compound to polyglycol of between about 0.5 and 1.5 moles per mole.

These polymeric products may be prepared by a method in which catalytic amounts of a Friedel-Crafts type catalyst or an alkali metal alcoholate-forming compound for the polyglycol were found to promote the reaction of the polyoxyalkylene polyol and the polyepoxy compound. The alkali metal alcoholate-forming compound can, according to that process, be an alkali metal, alkali metal oxide, alkali metal hydroxide, alkali metal hydride, alkali metal alcoholate and the like and are employed to form the alkali metal alcoholate of the polyglycol. It is not critical to the operation of the reaction that the alcoholates of the polyglycol be made in any particular manner, the presence of the alkali metal alcoholate-former being sufficient to cause the reaction of the polyglycol and polyepoxy compound. Amounts of as low as 0.05 percent by weight of the polyglycol of the alkali metal alcoholate-forming compound or the Friedel-Crafts type catalyst were found to be sufficient to promote the reaction, with 0.1 to 0.5 percent being preferred to produce the polymeric antistatic agents, although greater amounts can be used.

These polymeric products of the reaction of the polyoxyalkylene polyol and a polyepoxy compound are effective in suppressing the accumulation of electrostatic charges when employed in amounts of at least one part by weight per hundred parts of the resinous compositions. For most applications, amounts of about two to ten parts by weight per hundred parts of the resinous composition are preferred, although greater amounts can be employed. The optimum concentration of antistatic agent is dependent upon such factors as the degree of static protection desired and the resinous composition to be treated.

Little or no change in physical properties of the resinous compositions are noticed when the antistatic agents are employed within these preferred limits. With polystyrene resins for example, no changes in physical properties such as heat distortion temperatures, Izod impact values and flow temperatures are noticed, and with vinyl compositions, only a slight plasticization occurs which can be easily corrected by adjustment of plasticizer concentration or by suitable selection of antistatic agent, such as employing one of the more rigid antistatic agents to reduce plasticizing effect if such is undesirable.

The antistatic agents of this invention can be incorporated into a wide variety of plastic or resinous compositions normally tending to accumulate electrostatic charges during their service life. Such plastic compositions which are susceptible to accumulating static charges in which the antistatic agents are particularly useful include the hydrophobic polymers of a mono-vinylidene compound such as polyvinyl chloride, polyvinyl acetate, vinyl chloride-vinyl acetate copolymers, polymethacrylates, vinylidene chloride copolymers, polystyrene and polystyrene modified with rubber or hydrocarbon wax and the like. Particularly good results are obtained on vinyl compositions, such as those composed predominantly of vinyl chloride or vinyl acetate. The plastic compositions can, after the incorporation of the antistatic agent, be formed in any desired shape such as sheets, films, filaments, or into cast or molded articles. The resinous compositions into which these antistatic agents may be incorporated can also contain other materials such as dyes, pigments, fillers, plasticizers, lubricants, surface active agents, and the like without adversely affecting the effectiveness of these antistatic agents.

These products can be incorporated into the resin during any stage of the preparation of the resin itself, or by mixing into the resin blend before the forming operation.

Water extraction tests have shown that even the water-soluble antistatic agents employed in this invention are substantially permanent during the service life of the plastic composition. I have discovered that after leaching with water for one week, only about 2 to 5 percent of the antistatic agent originally present leached out of a composition containing 100 parts vinyl resin and 5 parts by weight of a water-soluble reaction product of a polyoxyethylene glycol having an average molecular weight of about 6000 with 2.9 percent of the diglycidyl ether of 2,2-bis(4-hydroxyphenyl)propane. Other leaching experiments have shown that antistatic protection is not seriously affected by leaching, washing or extraction with water, and that effectiveness is substantially permanent over the service life of the resinous composition.

For purposes of evaluating these materials, I have incorporated the antistatic agents into the resinous composition on a roll mill or Banbury mixer at 100° C.–150° C. and then pressed plaques approximately 15 mils thick for testing. All samples were aged a minimum of 16 hours at about 70° F. and a relative humidity of 50 percent prior to testing, although such aging is not necessary for final application purposes. The plaques were subjected to two simple tests to determine static generation. One test comprised vigorously rubbing the plaque ten times on wool flannel. The plaque then was held one inch above a pan containing carbon black and cigarette ashes. The amount of dirt pickup was quantitatively estimated as heavy, medium, slight or none. Another test consisted of measuring with a variable capacitance electrostatic voltmeter, the static generated when the plaque was rubbed in a standard but arbitrary manner with a clean wool flannel. After rubbing, the plaque is quickly placed in a metal container connected to the electrostatic voltmeter. The reading in volts on the voltmeter is regarded as being an indication of the static charge in the plastic sample, with a reading of about 400 volts or less considered small enough to indicate practical antistatic protection.

The following examples are illustrative.

Example 1

Two 50 gram samples of a resinous copolymer containing 85–88 percent vinyl chloride and 12–15 percent vinyl acetate and 0.25 gram of dibutyl tin maleate as a stabilizer were separately milled on a roll mill at 110° C. One sample was maintained as a control sample and to the other sample, 5.0 grams of a water soluble wax-like reaction product of a polyoxyethylene glycol having an average molecular weight of 6000 and 3 percent of the diglycidyl ether of 2,2-bis(4-hydroxyphenyl)propane (mole ratio 1:0.53) was added during the mixing cycle. After mixing each sample was molded in a plaque and aged at room conditions for 16 hours. They had the following properties:

| | Dirt Pickup | Static Generation, Volts | Surface Condition |
|---|---|---|---|
| Control sample | Heavy | 950 | |
| Treated sample | None | 300 | no sweat out. |

Example 2

Two 30 gram samples of a wax-modified polystyrene (phonograph record composition containing about 6 percent waxes), were separately milled on a roll mill for 15 minutes at 150° C. To one sample, three grams of a water soluble wax-like reaction product of a polyoxyethylene glycol having an average molecular weight of about 6000 and 2.9 percent of diglycidyl ether of 2,2-bis(4-hydroxyphenyl)propane (mole ratio 1:0.51) was added during the mixing cycle. After mixing, each sample was molded and aged for sixteen hours at 70° F. They had the following properties:

| | Dirt Pickup | Static Generation, Volts | Surface Condition |
|---|---|---|---|
| Control sample | Heavy | 750 | |
| Treated sample | None | None | no sweat out. |

Example 3

Two 30 gram samples of a commercial vinyl chloride-vinylidene chloride copolymer resin and 0.30 grams of dibutyl tin maleate as a stabilizer were separately milled on a roll mill for 7–10 minutes at 150° C. To one sample 0.6 gram of a water-soluble, wax-like reaction product of a polyoxyethylene glycol having an average molecular weight of about 6000 and 2.9 percent of diglycidyl ether of 2,2-bis(4-hydroxyphenyl)-propane (mole ratio 1:0.51) was added during the mixing cycle. After aging specimens of each sample at room conditions for 16 hours, they had the following properties:

| | Dirt Pickup | Static Generation, Volts | Surface Condition |
|---|---|---|---|
| Control sample | Heavy | 1,000 | |
| Treated sample | None | 200 | no sweat out. |

Example 4

Two 30 gram samples of a commercial polymethacrylate resin were separately milled on a roll mill. To one sample, three grams of a water soluble wax-like reaction product of a polyoxyethylene glycol having an average molecular weight of about 1540 and 16 percent of diglycidyl ether of 2,2-bis(4-hydroxyphenyl)propane (mole ratio 1:0.725) was added during the mixing cycle. After aging specimens of each sample at room temperature for 16 hours, they had the following properties:

| | Dirt Pickup | Static Generation, Volts | Surface Condition |
|---|---|---|---|
| Control sample | Heavy | >1,000 | |
| Treated sample | Medium | 550 | no sweat out. |

Example 5

To a 50 gram sample of a resinous copolymer containing 85–88 percent vinyl chloride and 12–15 percent vinyl acetate, 0.25 gram of dibutyl tin maleate was added as a stabilizer and mixed on a roll mill at 110° C., with 5 grams of the water insoluble resinous reaction product of a polyoxyethylene glycol having an average molecular weight of about 6000, and two percent butadiene diepoxide (mole ratio 1:1.4). A specimen plaque was aged at 70° C. for 16 hours for comparison of properties with a control sample prepared as follows:

To a 30 gram sample of the same resin as above, containing 85–88 percent vinyl chloride and 12–15 percent vinyl acetate, 0.2 gram of dibutyl tin maleate as a stabilizer, 3.0 grams of polyoxyethylene glycol having an average molecular weight of about 6000 were added and mixed in a roll mill at 110° C. A specimen plaque was aged at 70° C. for 16 hours for comparison of properties with the polyepoxy modified polyoxyethylene glycol containing specimen. They had the following properties:

| | Dirt Pick-up | Static Generation, Volts | Surface Condition |
|---|---|---|---|
| Control sample | very light | 250 | smearing. |
| Treated sample | do | none | no smearing or sweat out. |

Example 6

Two 30 gram samples of a resinous copolymer containing 85–88 percent vinyl chloride and 12–15 percent vinyl acetate were prepared in the following manner:

One sample, for control check, was mixed on a roll mill with 0.2 gram of dibutyl tin maleate as a stabilizer and 3.0 grams of a polyoxyethylene glycol having an average molecular weight of about 1000.

The other sample was mixed on a roll mill with 0.2 gram of dibutyl tin maleate as a stabilizer and 1.5 grams of a partially water soluble wax-like reaction product of a polyoxyalkylene glycol having an average molecular weight of about 1540 with 16 percent of the weight of the glycol of the diglycidyl ether of 2,2-bis(4-hydroxyphenyl)propane (mole ratio 1:0.725) for 20 minutes and 110° C.

Specimen plaques of both samples were aged at 70° F. for 16 hours. After aging they had the following properties:

| | Dirt Pickup | Static Generation, Volts |
|---|---|---|
| Control sample | Heavy | 950 |
| Treated sample | None | none |

Example 7

To 1500 grams of a resinous copolymer containing 85–88 percent vinyl chloride and 12–15 percent vinyl acetate, 15 grams of dibutyl tin maleate as a stabilizer and 225 grams of the partially water soluble reaction product of a polyoxyethylene glycol having an average molecular weight of about 6000 and 4 percent of the weight of the glycol of the diglycidyl ether of 2,2-bis(4-hydroxyphenyl)propane (mole ratio 1:0.70) were mixed on a Banbury mill for 5 minutes at 110° C. and formed into sheet on a roll mill. A specimen plaque of this material was aged for 16 hours and was tested in the established manner. The plaque showed no static generation, no dirt pickup and surface condition was unchanged.

Example 8

To a 50 gram sample of a resinous copolymer containing 85–88 percent vinyl chloride and 12–15 percent vinyl acetate, 0.5 gram of dibutyl tin maleate was added as a stabilizer and mixed on a roll mill for 15 minutes at 120° C. with 2.5 grams of the resinous reaction product of a polyoxyalkylene triol having a hydroxyl equivalent of about 2.4 and an average molecular weight of about 2100 with 15.16 percent by weight of diglycidyl ether of 2,2-bis(4-hydroxyphenyl)propane. A specimen plaque was aged for 16 hours at 70° C. This sample was tested as in the previous examples and had the following properties:

Dirt pick up _____ light.
Static generation _____ 300 volts.
Surface condition _____ no smearing or sweat out.

Example 9

Two 35 gram samples of a resinous copolymer containing 96 percent vinyl chloride and 4 percent vinyl acetate containing 15 grams of dioctyl phthalate as a plasticizer and 0.25 gram of dibutyl tin maleate as a stabilizer were prepared in the following manner:

Sample A was used as a control sample.

Sample B was mixed on a roll mill with 1.75 grams of the product produced by reacting a polyoxyethylene glycol having an average molecular weight of about 1540 with 16 percent of the weight of the glycol of the diglycidyl ether of 2,2-bis(4-hydroxyphenyl)propane (mole ratio 1:0.725) for 10–15 minutes at 150° C.

Plaques were prepared in the standard manner. A test sample of B was leached for five days in distilled water, air dried for two days at room conditions, and oven dried for 24 hours at 60° C., and then allowed to age in the constant temperature, constant humidity room.

They were then checked in the accustomed manner for static generation with the following results:

| Sample | Static Generation, Volts | | |
|---|---|---|---|
| | Original—No oven drying, No leaching | Oven Drying Only | Leaching And Oven Drying |
| A [1] | 650 | 650 | 750 |
| B | none | none | none |

[1] No antistatic agent.

Example 10

Four 50 gram samples of a vinyl resin containing 85–88 percent vinyl chloride and 12–15 percent vinyl acetate, containing 0.5 gram of dibutyl tin maleate as a stabilizer were prepared for determination of degree of leaching by water on various antistatic agents. One sample was maintained as a control. To the other three samples, different antistatic agents of this invention were incorporated into the resin, and blended on a roll mill. The samples were leached for five days in distilled water, and air dried for two days at room conditions, and then oven-dried for 24 hours at 60° C., and then allowed to age in a constant 73° F. room at a constant 50 percent relative humidity. The control sample was subjected to the heating at 60° C. for 24 hours and then aged at 73° F. and 50 percent relative humidity. Static generation was measured by rubbing the samples in a standard manner with a clean wool flannel and measuring the voltage on an electrostatic voltmeter. The following table represents a summary of the findings:

| Resin Sample, gms. | Antistatic Agent | Grams | Static Generation, Volts | |
|---|---|---|---|---|
| | | | Original | After Leaching |
| 50 | | 0 | 1,000 | 1,000 |
| 50 | A | 2.5 | 750 | 350 |
| 50 | B | 2.5 | 600 | 600 |

A—reaction product of a polyoxyethylene glycol having an average molecular weight of about 6000 with 2 percent butadiene diepoxide (mole ratio 1 : 1.46).
B—reaction product of a polyoxyethylene glycol having an average molecular weight of about 1540 with 16 percent of the diglycidyl ether of 2,2-bis(4-hydroxyphenyl)propane (mole ratio 1 : 0.725).

A sample prepared and tested in a similar manner using 7.2 grams of a commercial antistatic agent (35 percent solution of stearamido propyl dimethyl-B-hydroxy-ethammonium phosphate sold by American Cyanamid Company) in 50 grams of the same vinyl resin showed a static generation after leaching of 800 volts, and 2.5 grams of a hydroxyamine antistatic agent manufactured by Alframine Corporation, in 50 grams of the same vinyl resin generated 700 volts after leaching in a similar manner. A commercial antistatic polystyrene sold by Erinoid Ltd., after leaching and testing in a similar manner generated 250 volts.

I claim:

1. As a new composition of matter, a polymer of a monovinylidene compound which has a tendency to accumulate electrostatic charges containing at least 1 part by weight per 100 parts of said polymer of the polymeric reaction product of (A) the reaction product of an alkylene oxide having terminal epoxy groups with an organic compound having at least 2 primary alcoholic hydroxyl groups, and having an average molecular weight of at least 600 and (B) an organic polyepoxy compound selected from the group consisting of butadiene diepoxide, diglycidyl ether, and the diglycidyl ether of 2,2-bis(4-hydroxyphenyl) propane, said polymeric reaction product containing reacted therein between about 0.2 mole to about 2.0 moles of the organic polyepoxy compound per mole of the said reaction product of the said alkylene oxide.

2. A composition of matter as in claim 1 wherein the polyepoxy compound is butadiene diepoxide.

3. A composition of matter as in claim 1 wherein the polyepoxy compound is composed predominantly of the diglycidyl ether of 2,2-bis(4-hydroxyphenyl)propane.

4. As a new composition of matter, a polymer of a monovinylidene compound which has a tendency to accumulate electrostatic charges containing at least 1 part by weight per 100 parts of said polymer of the polymeric reaction product of (A) a polyoxyalkylene glycol having an average molecular weight between about 1,000 and 10,000 with (B) between about 0.2 mole to about 2.0 moles of an organic polyepoxy compound per mole of the said polyoxyalkylene glycol, said polyepoxy compound selected from the group consisting of butadiene diepoxide, diglycidyl ether, and the diglycidyl ether of 2,2-bis(4-hydroxyphenyl) propane.

5. A composition of matter as in claim 4 wherein the polyoxyalkylene glycol is a polyoxyethylene glycol.

6. A composition of matter as in claim 4 wherein the polyepoxy compound is butadiene diepoxide.

7. A composition of matter as in claim 4 wherein the polyepoxy compound is composed predominantly of the diglycidyl ether of 2,2-bis(4-hydroxyphenyl)propane.

8. A composition of matter as in claim 4 wherein the monovinylidene compound polymer is a hydrophobic thermoplastic vinyl polymer.

9. A composition of matter as in claim 4 wherein the monovinylidene compound polymer is a polystyrene resin.

10. A composition of matter as in claim 4 wherein the monovinylidene compound polymer is a vinyl chloride-vinyl acetate copolymer.

11. A composition of matter as in claim 4 wherein the monovinylidene compound polymer is a vinylidene chloride-vinyl chloride copolymer.

References Cited in the file of this patent
UNITED STATES PATENTS 2,731,444    Greenlee _____ Jan. 17, 1956